United States Patent [19]

Karlstrom et al.

[11] 3,853,027
[45] Dec. 10, 1974

[54] APPARATUS FOR CUTTING RESILIENT POROUS MATERIAL

[75] Inventors: Rolf G. E. Karlstrom; Leif A. Jansson, both of Eskilstuna, Sweden

[73] Assignee: Forenade Fabriksverken, Eskilstuna, Sweden

[22] Filed: May 25, 1973

[21] Appl. No.: 363,882

[30] Foreign Application Priority Data
June 6, 1972   Sweden.............................. 7376/72

[52] U.S. Cl........................... 83/4, 83/409, 83/628, 83/824, 83/926 R
[51] Int. Cl........................... B26d 3/12, B26d 3/28
[58] Field of Search............ 83/1, 4, 409, 422, 628, 83/824, 926 R

[56] References Cited
UNITED STATES PATENTS

| | | | |
|---|---|---|---|
| 1,545,332 | 7/1925 | Kase | 83/4 |
| 2,213,721 | 9/1940 | Skold | 83/4 |
| 3,145,601 | 8/1964 | McDanal | 83/1 |
| 3,331,416 | 7/1967 | Waller | 83/1 X |
| 3,747,448 | 7/1973 | Carbone | 83/4 |
| 3,786,701 | 1/1974 | Ludwig | 83/4 X |

*Primary Examiner*—Frank T. Yost
*Attorney, Agent, or Firm*—Fitch, Even, Tabin & Luedeka

[57] ABSTRACT

Apparatus for cutting or slitting a resilient porous material such as foamed polyurethane which employs a material support carriage movable to feed the material against a reciprocating cutting knife in a manner to slit the material from one edge surface without cutting the material along the side edges peripherally of the intended slit.

4 Claims, 5 Drawing Figures

PATENTED DEC 10 1974 3,853,027

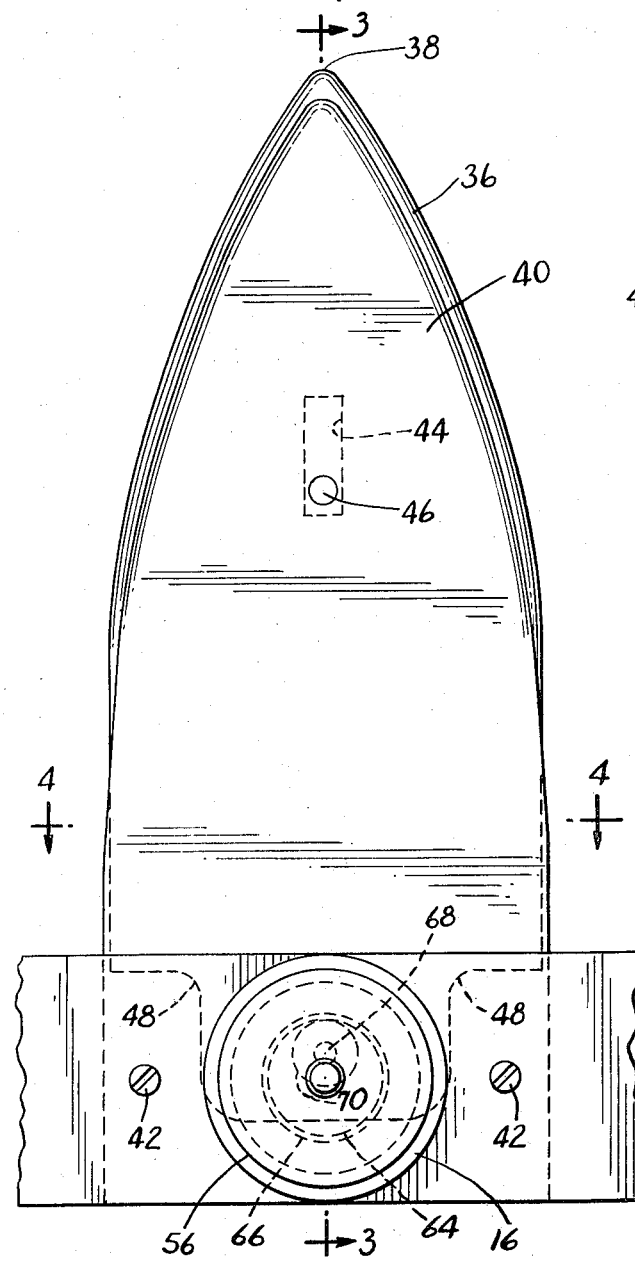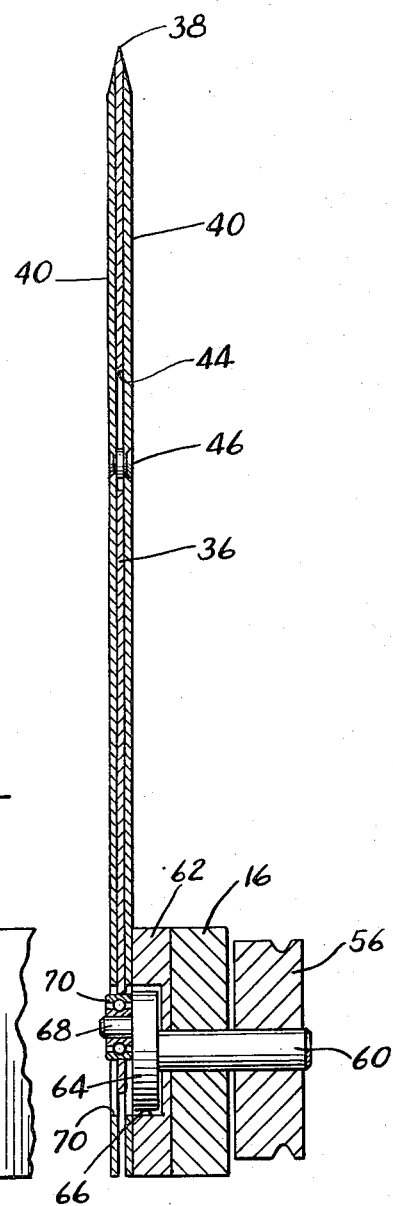

APPARATUS FOR CUTTING RESILIENT POROUS MATERIAL

The present invention relates generally to cutting or slitting apparatus, and more particularly to a novel method and apparatus for precision cutting resilient porous material to produce a porous cover suitable for use with a washing head to wash delicate human skin and the like.

When cutting foamed plastic material, such as foamed polyurethane problems arise due to the tendency of the material to "move away" from the cutting tool. The difficulty in cutting foamed polyurethane materials may vary between cutting operations depending upon the softness and elasticity of the particular material being cut. Known methods of cutting soft porous foamed polyurethane material include punching, cutting with hot wire, and cutting with a vibrating knife.

Recent advances in patient washing apparatus, as exemplified by the patient washing apparatus disclosed in the copending application of Tord G. Lundblad, Ser. No. 316,675, filed Dec. 20, 1972, have introduced the use of washing heads which employ porous covers or gloves through which a foam washing medium is applied to a patient's skin and is withdrawn by suction. An example of such a washing head is disclosed in the copending application of Jan-Eric Engquist, Ser. No. 305,002, filed Nov. 9, 1972, (File 32118). The porous covers for such washing heads must be free of hard ridges or sharp edges which would not be compatible with the delicate and possibly infected skin of the patients being washed. Manufacture of these porous covers by sewing, gluing or welding two pieces of foamed polyurethane material, such as foam rubber, along their peripheral edges, or by joining a thin foamed polyurethane sheet with a similarly shaped back-up piece of cloth or vinyl, produces a cover having sharp peripheral edges. Using the hot wire method to cut or slit a piece of foamed polyurethane material to form a porous cover is also unsatisfactory because the permeability of the porous material is adversely affected. Foamed polyurethane material cut by the hot wire technique also presents packaging problems as the stacked pieces have a greater tendency to stick together.

One of the primary objects of the present invention is to provide a method and apparatus for cutting or slitting resilient porous material in a manner which overcomes the disadvantages found in the prior art techniques.

Another object of the present invention is to provide apparatus for precision cutting or slitting a unitary piece of resilient porous material such as foamed polyurethane from one edge surface of the material intermediate its upper and lower surfaces without severing the remaining peripheral edges of the piece of material.

A further object of the present invention is to provide a method and apparatus for cutting or slitting a unitary piece of resilient porous material to form a porous glove, which apparatus employs a novel combination of workpiece holder means and a cutter knife reciprocally operable through relatively short strokes to precision cut the foamed polyurethane material.

Another object of the present invention is to provide a method for manufacturing porous gloves or covers from a resilient porous material such as foamed polyurethane, which method includes simultaneously cutting a plurality of parallel slits in a unitary block of the foamed polyurethane material having the desired outer configuration, and thereafter simultaneously cutting the block into individual gloves each having a slit entrance intermediate its upper and lower surfaces.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 2 is a partial plan view illustrating the cutting knife employed in the apparatus of FIG. 1;

FIG. 3 is a longitudinal sectional view taken generally along the line 3—3 of FIG. 2;

Figure 5:
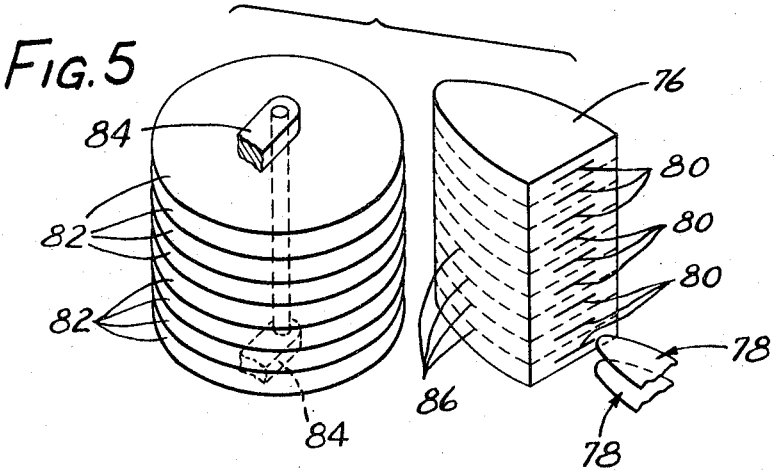
Figure 4:
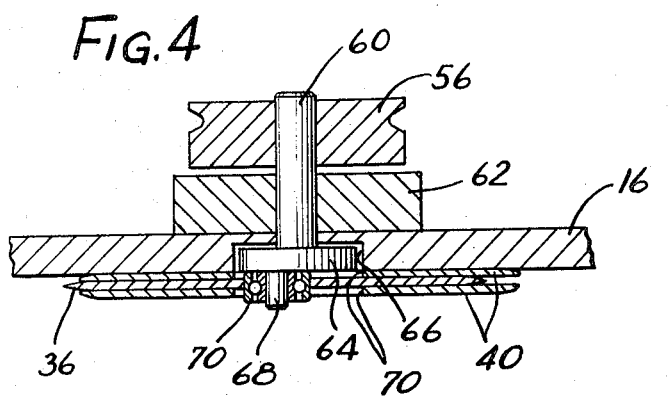
FIG. 4 is a transverse sectional view taken along the line 4—4 of FIG. 2.

FIG. 5 schematically illustrates a method of simultaneously making a plurality of cover gloves from a unitary block of foamed polyurethane material.

Referring now to the drawings, an apparatus in accordance with the present invention for cutting or slitting a resilient porous material such as foamed polyurethane is indicated generally at 10. The apparatus 10 includes a base plate 12 having a pair of laterally spaced parallel rails 14 secured thereon, the rails 14 being L-shaped in cross section and supporting a cross-plate 16 at their forward ends. The cross-plate 16 may be integral with or suitably affixed to the upper edges of the rails 14 as shown. The rails 14 provide guide means for a wheeled carriage, indicated generally at 18, adapted to fixedly support and retain a workpiece of resilient porous material thereon during a cutting or slitting operation. The wheeled carriage 18 includes a lower support plate 20 having pairs of freely rotatable wheels 22 mounted on the lower surface thereof, the wheels 22 being adapted for rolling engagement along the rails 14 to allow movement of the carriage 18 longitudinally of the base plate 12.

The support plate 20 of the wheeled carriage 18 has a workpiece receiving form or retainer 24 suitably secured on the upper surface thereof. The workpiece receiving form 24 has an internal configuration corresponding in size to the outer peripheral configuration of a resilient porous workpiece, as indicated at 26, such that the workpiece may be inserted into the form 24 and retained therein preparatory to cutting or slitting the workpiece generally intermediate its upper and lower surfaces. A piece of high-friction material (not shown), such as emery cloth, is preferably fixedly placed in the bottom of the form 24 for engagement with the lower surface of the workpiece 26 when placed in the form to assist in retension of the workpiece within the form.

The carriage 18 includes an upper cover member 28 which is hingedly connected to the support plate 20 through hinge members 30. The cover member 28 has a workpiece engaging hold-down element 32 secured to the lower surface thereof and adapted to engage the upper surface of the workpiece 26 when the cover member 28 is moved to a lowered position engaging the upper edge surface of the form 24. The hold-down element 32 preferably comprises a sheet of resilient porous material, such as foamed polyurethane, similar to the workpiece material 26, and has an outer configuration which allows the hold-down element to be received within the form 24 in engagement with the upper surface of the workpiece 26 when the cover member 28 is moved to its lowered position.

The cutting apparatus 10 includes cutting knife means, indicated generally at 34, supported by the cross-plate 16. The cutting knife means 34 includes a flat knife blade 36 which has a peripheral cutting edge having a plan configuration substantially identical to the desired plan configuration of the cut or slit to be cut in the workpiece 26. The illustrated knife blade 36 has a generally triangular configuration, the long cutting edges of which are curved outwardly and meet at an apex 38 which forms the forward end of the cutting knife. The cutting knife is retained between two flat thin cover plates 40 which have plan configurations similar to the plan configuration of the knife blade 36. The cover plates 40 are secured together in spaced relation with the knife blade therebetween in sliding sandwich fashion. The cover plates 40 are secured centrally to the lower surface of the cross-plate 16 through screws 42. The knife blade 36 has a rectangular slot 44 therein which receives a guide pin 46 secured to and between the cover plates 40. The guide pin 46 provides guide means for the cutting knife 36 as it is reciprocated relative to the cover plates 40 as will become more apparent hereinbelow. The cover plates 40 have a coating of low-friction material thereon, such as polytetrafluoroethylene, to reduce friction with the knife blade 36 as well as to provide a low coefficient of friction when engaging the foamed polyurethane material workpiece 26 during a cutting operation.

The knife blade 36 is recessed on both sides of its rearward end, as shown at 48 in FIG. 2, to allow reciprocating movement of the knife blade without interfering with the cover plate support screws 42. To effect reciprocating movement of the knife blade 36 relative to the cover plates 40, an electrical drive motor 50 is supported on a motor mount 52 in spaced relation above the base plate 12. The electric motor 50 has a drive pulley 54 secured on its drive shaft which is coupled to a driven pulley 56 through an endless drive belt 58. The pulley 56 is secured on the upper end of a crank pin 60 which is supported by the cross-plate 16 through a bearing block 62 affixed centrally to the upper surface of the cross-plate 16. The crank pin 60 has a circular plate 64 secured to the lower end thereof, the plate 64 being received within a suitable recess 66 in the lower surface of the cross-plate 16 for free rotation therein. The circular plate 64 has a depending pin 68 secured to the lower surface thereof, the pin 68 being eccentrically mounted relative to the axis of the crank pin 60. The eccentric pin 68 is connected to the rearward end of the knife blade 36 through an anti-friction bearing 70 such that rotation of the crank pin 60 through rotation of the pulley 56 effects reciprocating movement of the knife blade 36 relative to the cover plates 40. A suitable circular opening 72 is provided in each of the cover plates 40 to provide clearance for rotation of the bearing 70 without interfering with the cover plates 40. It will be understood that as the crank pin 60 rotates, the rearward end of the knife blade 36 alternately oscillates outwardly from the side edges of the cover plates 40 as well as the forward end of the knife reciprocating in a forward direction relative to the cover plates.

Design perameters that are important to efficient and precision operation of the cutting apparatus 10 when employed to cut or slit a foamed polyurethane workpiece such as 26 include the following. The electric drive motor 50 should have a rotational speed of 3–4,000 RPM. The eccentricity of the axis of the pin 68 relative to the axis of the crank pin 60 should be fixed at 3–4 millimeters. The maximum distance which the forward end 38 of the knife blade 36 projects outwardly from the cover plates 40 during operation should be limited to approximately 5 millimeters. A frictional coating on the cover plates 40 should be selected having a coefficient of friction low enough so as not to frictionally adhere to and deform the foamed polyurethane workpiece 26 when initially beginning a cutting operation.

Figure 1:
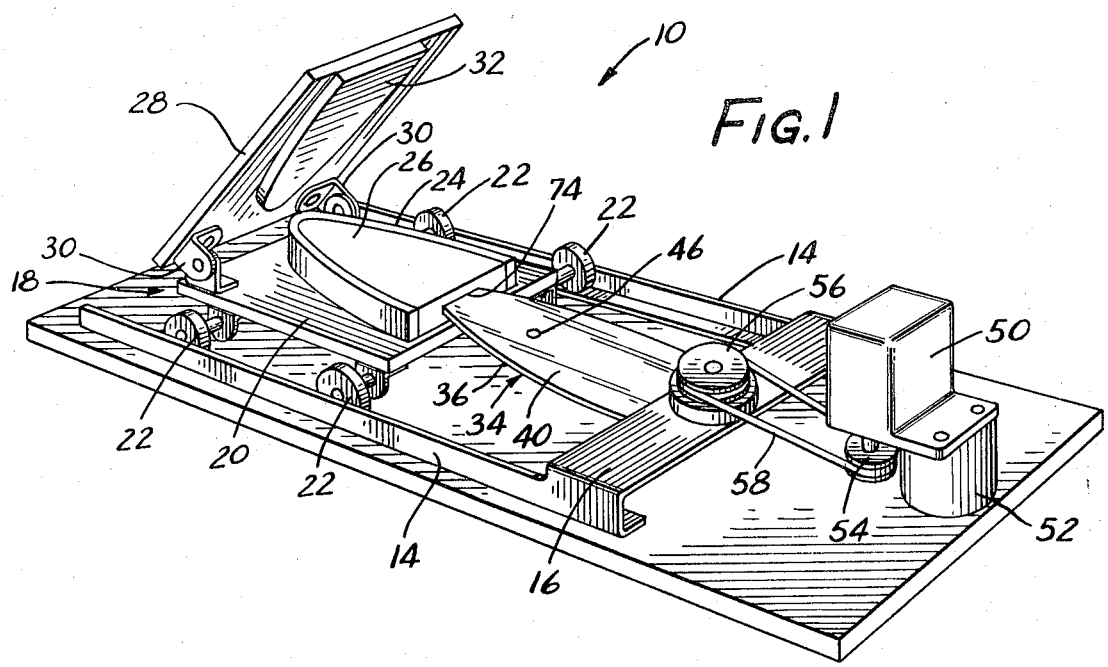
FIG. 1 is a perspective view of a cutting apparatus in accordance with the present invention.

In operation, a resilient porous material workpiece 26, such as foamed polyurethane, is placed within the form 24 on the carriage 18 with the end surface of the workpiece through which a cut or slit is to be made facing the cutting knife means 34. The lid 28 is then moved to a lowered position wherein the hold-down element 32 engages the upper surface of the workpiece 26 to fixedly retain the workpiece within the form 24. The electric drive motor 50 is energized to effect reciprocating movement of the knife blade 36 relative to the cover plates 40. The carriage 18 is then moved in a direction toward the cutting knife means 34 either manually or by automatic control means (not shown) to effect entry of the cutting knife into the forward edge surface of the workpiece 26. By restricting the cutting knife 36 to relatively small strokes or oscillations relative to the cover plates 40, a slit or cut, such as indicated at 74 in FIG. 1, may be made in the workpiece 26 intermediate the upper and lower surfaces thereof without severing or cutting through the material of the workpiece along the peripheral edges thereof engaging the form 24. In this fashion, a porous glove having an entry 74 therein may be precision manufactured which is particularly suitable for use in a washing head of the type disclosed in the aforereferenced copending application of Jan-Eric Engquist.

The present invention also contemplates a method of making porous gloves from a resilient porous material, such as foamed polyurethane, wherein a plurality of gloves are made simultaneously. This method is shown schematically in FIG. 5 and includes the steps of positioning in cutting position a block of foamed polyurethane material, such as indicated at 76, having an outer surface configuration generally equal to the desired outer edge surface configurations of the finished gloves and having a vertical height equal to the combined height of a predetermined number of finished gloves, such as ten. The block 76 of foamed polyurethane material is positioned in a work station having ten vertically aligned and spaced cutting knife assemblies, two of which are illustrated generally at 78 in FIG. 5. Each of the cutting knife assemblies 78 is similar to the above described knife means 34. The knife assemblies 78 are supported for movement into engagement with the block of material 76 whereby the reciprocating cutting knife assemblies effect cutting of a plurality of slits, such as indicated at 80, in the block workpiece 74. The number of knife blade assemblies 78 in the vertically stacked assembly of knife blades corresponds to the number of gloves to be made from the block 74 of resilient porous material.

After cutting the slits 80 in the block 74 of foamed polyurethane material, the cutting knife assemblies 78 are retracted and a plurality of rotating circular cutting discs 82 are brought into cutting engagement with the block 74. The cutting discs 82 are supported in vertically spaced relation for arcuate movement toward the block 74 by support arms 84. The cutting discs 82 are adapted to sever the block 74 horizontally along cutting lines 86 into a plurality of pieces of predetermined vertical thickness, each piece having a thickness equal to the thickness of the desired glove to be made, and each of the glove pieces having a slit 80 cut intermediate its upper and lower surfaces. After the block 74 of material has been slit into individual gloves by the cutting discs 82, the gloves are maintained in stacked relation and may be moved to a packaging station wherein a plastic covering may be placed over the stacked gloves and sealed thereon to effect vacuum packaging of the stacked gloves.

It has been found that cutting or slicing of resilient porous material, such as foamed polyurethane, as hereinabove described results in a porous glove which is uniformly soft throughout its structure and lends itself to application against a patient's skin when used in conjunction with a patient washing apparatus. The apparatus and method in accordance with the present invention eliminates the need for undesirable sewing or adhesive gluing along the peripheral edges of the upper and lower porous sheets of the gloves as has heretofore been practiced, and also provides a clean cut through the cellular structure to retain the desired porosity characteristics of the resilient porous material.

While preferred embodiments of the present invention have been illustrated and described, it will be obvious to those skilled in the art that changes and modifications may be made therein without departing from the invention and its broader aspects. Various features of the invention are defined in the following claims.

We claim:

1. Apparatus for cutting a slit in a workpiece of resilient porous material to form a glove-like cover having upper and lower surfaces between which the slit is to be made, said apparatus comprising, in combination, a base plate, track means supported by said base plate, workpiece support means supported by said track means and including a carriage having means thereon to fixedly retain a workpiece of resilient porous material thereon preparatory to cutting a slit in an edge surface thereof, a generally flat cutting knife supported by said base plate, and means for longitudinally reciprocating said cutting knife, said track means and said carriage being cooperable so that said carriage is movable in a direction generally parallel to the longitudinal axis of said cutting knife to effect engagement of said reciprocating cutting knife with said edge surface of said workpiece when supported on said carriage such that a slit is cut in said workpiece intermediate the upper and lower surfaces thereof with the workpiece remaining integral along the peripheral portion of said slit opposite said edge surface, said cutting knife having a cutting edge of sufficient size to cut the desired slit in the resilient porous workpiece when said carriage is moved in said longitudinal direction of said cutting knife a predetermined distance.

2. Apparatus for cutting a slit in a workpiece of resilient porous material to form a glove-like cover having upper and lower surfaces between which the slit is to be made, said apparatus comprising, in combination, a base plate, track means supported by said base plate, workpiece support means supported by said track means and adapted to fixedly retain a workpiece of resilient porous material thereon preparatory to cutting a slit in an edge surface thereof, a generally flat cutting knife supported by said base plate, upper and lower cover plates disposed on opposite surfaces of said flat cutting knife and providing guide means for said cutting knife, and means for reciprocating said cutting knife relative to said cover plates, said workpiece support means being movable to effect engagement of said reciprocating cutting knife with said edge surface of said workpiece when supported on said support means such that a slit is cut in said workpiece intermediate the upper and lower surfaces thereof with the workpiece remaining integral along the peripheral portion of said slit opposite said edge surface.

3. Apparatus as defined in claim 2 wherein said upper and lower cover plates are coated with a material having a low coefficient of friction so as to minimize frictional drag between said cover plates and said knife blade and between said cover plates and said resilient porous material workpiece as a slit is cut therein.

4. Apparatus as defined in claim 2 wherein said knife blade and said cover plates have substantially identical plan configurations such that said knife blade may be substantially completely covered by said cover plates, and wherein said means for effecting reciprocating movement of said cutting knife includes means for effecting movement of said knife blade outwardly from the edges of said cover plates a maximum distance of 5 millimeters.

* * * * *